United States Patent [19]

Roberts

[11] Patent Number: 4,724,249

[45] Date of Patent: Feb. 9, 1988

[54] COMPOSITIONS FOR RUST TREATMENT

[75] Inventor: Daniel C. Roberts, Abingdon, Great Britain

[73] Assignee: Neutra Rust International Limited, Staines, England

[21] Appl. No.: 16,466

[22] PCT Filed: Aug. 26, 1983

[86] PCT No.: PCT/GB83/00211

§ 371 Date: Apr. 26, 1984

§ 102(e) Date: Apr. 26, 1984

[87] PCT Pub. No.: WO84/00973

PCT Pub. Date: Mar. 15, 1984

Related U.S. Application Data

[63] Continuation of Ser. No. 868,208, May 23, 1986, abandoned, which is a continuation of Ser. No. 606,824, Apr. 26, 1984, abandoned.

[30] Foreign Application Priority Data

Aug. 31, 1982 [GB] United Kingdom ................ 8224789

[51] Int. Cl.4 .............................................. C08C 19/20
[52] U.S. Cl. ................................................... 524/345
[58] Field of Search ............................... 524/345, 384

[56] References Cited

U.S. PATENT DOCUMENTS 4,287,298 9/1981 Dodwell ............................ 430/529

FOREIGN PATENT DOCUMENTS 0030080 6/1981 European Pat. Off. .
0035316 9/1981 European Pat. Off. .
2555597 6/1977 Fed. Rep. of Germany .
1558411 1/1980 United Kingdom .
2075538 11/1981 United Kingdom .

Primary Examiner—Theodore Morris
Attorney, Agent, or Firm—DeLio & Associates

[57] ABSTRACT

The invention is a rust proofing composition containing a copolymer in latex form derived from:
  (i) vinylidene chloride
  (ii) vinyl chloride; and
  (iii) one or more alkyl acrylates and/or alkyl metharcylates having from 1 to 12 carbon atoms is the alkyl group; and
a chelating agent comprising pyrogallol, said pyrogallol being present in an amount between 0.5 and 5.0 percent by weight of said aqueous emulsion.

10 Claims, No Drawings

COMPOSITIONS FOR RUST TREATMENT

This is a continuation of application Ser. No. 868,208, filed May 23, 1986, now abandoned, which is a continuation of application Ser. No. 606,824, filed Apr. 26, 1984, now abandoned.

The present invention relates to compositions for rust treatment for use on articles made of iron and steel, whether free from oxidation or not, of the kind comprising a dispersion or emulsion of a film-forming agent such as a polymer emulsion together with a chelating agent for chelating iron oxides.

Compositions of this kind have already been proposed, for example in German Offenlegungsschrift No. 25 55 597, Swiss Pat. specification No. 580 152 and British Pat. specification No. 1 494 212. In these prior disclosures gallic acid and tannin, among others, are disclosed as suitable chelating agents for chelating iron oxides.

Pyrogallol (1, 2, 3-trihydroxybenzene) has also been proposed as a chelating agent for chelating iron oxides in such compositions.

It is the aim of this invention to provide a water-based corrosion-inhibiting paint or varnish which, when applied to steel (whether rusted or not), will give a coating capable of substantially preventing further oxidation or corrosion and durable under severe conditions of damp and frost and durable against oil, acid or alkaline or other corrosive environments.

To be effective in practice a corrosion-inhibiting paint or varnish should be compatible with surface coatings in general use. The adhesion and fastness of the varnish film when properly applied should not be less than those of surface coatings in general use and superior in providing a primed surface to allow good finishes to be obtained. The varnish must be of low toxicity and not in itself strongly acid or caustic, not inflammable and must not give off inflammable, explosive or toxic vapours. It must be applicable by painting, spraying or dipping and should cure and dry at ambient temperatures and humidities in a relatively short time.

It has been found that particularly useful film-forming emulsions (or latices) for the purposes of the present invention are those described in the paper by A. J. Burgess, D. Caldwell and J. C. Padget in the Journal of the Oil and Colour Chemists' Association Volume 64, May 1981 pages 175-185, and also in the British Pat. specification No. 1558 411 and European patent application No. 0 030 080 A1. These documents are incorporated herein by reference. Products of the kind there described are sold by Imperial Chemical Industries Ltd as Haloflex 202 and Haloflex 208 ("Haloflex" is a registered Trade Mark).

The invention described and claimed in the aforesaid British patent is an aqueous latex comprising a copolymer derived from (i) vinylidene chloride, (ii) vinyl chloride, (iii) one or more alkyl acrylates having 1 to 12 carbon atoms in the alkyl group and/or one or more alkyl methacrylates having from 2 to 12 carbon atoms in the alkyl group and (iv) one or more aliphatic alpha-beta-unsaturated carboxylic acids, the proportion of vinylidene chloride being from 65 to 90 parts by weight the proportion of the said alkyl acrylates and/or methacrylates being from 2 to 15 parts by weight and the proportion of the said carboxylic acids being from 0.2 to 8 parts by weight, per hundred parts by weight of the total vinylidene chloride and vinyl chloride.

The aforesaid European patent application describes and claims an aqueous latex comprising a copolymer of (i) vinylidene chloride, (ii) vinyl chloride and (iii) one or more alkyl acrylates or alkyl methacrylates having from 1 to 12 carbon atoms in the alkyl group, characterised in that:

(a) the proportion of vinylidene chloride is from 20 to 95 parts by weight per hundred parts by weight of total vinylidene chloride and vinyl chloride, (b) the proportion of vinylidene chloride is not more than 75 parts by weight per hundred parts by weight of total vinylidene chloride, vinyl chloride and the said acrylate(s) and/or methacrylate(s) and (c) the proportion of the said acrylate(s) and/or methacrylate(s) is more than 15 but less than 45 parts by weight per hundred parts by weight of total vinylidene chloride and vinyl chloride.

The present invention therefore in one embodiment provides a corrosion-inhibiting paint or varnish comprising a film-forming latex as defined in the preceding paragraphs together with an effective amount, as chelating agent, of pyrogallol.

The permeability of water varnishes based on this latex was in the order of 1/100 of similar latices not containing vinylidene.

The addition of Pyrogallic acid introduced remarkable corrosion resisting qualities not otherwise easily obtained, for instance by the use of quarternary compounds or phosphoric acid.

Butyl Glycol ethers and ester alcohols were used to produce lower setting temperature effects and greater salt resistance.

Considerable difficulty was experienced with other chelating agents such as Tannic acid in that the latex became unstable without other additives which reduced efficiency.

One embodiment of the invention comprises the following composition:
Haloflex 202: 80-98%
Pyrogallol: 2-5%
Water: 0-10%

The preferred composition is that in which the pyrogallol is present at 3.0% and the pH is less than 6, preferably less than 4 the optimum being 1.8-2.5.

This product was subject to the testing procedures described below.

Tests were carried out on mild steel plates 6 inches×4 inches and on motor car body panels.

1. The compositions tested were in two main groups. (a) an acrylic/methacrylic copolymer emulsion containing 3% pyrogallol and (b) a vinylidene chloride/-vinyl/copolymer emulsion containing 3% pyrogallol (the preferred composition described above).

2. The plates used were from the same stock of bright mild steel, some of which had been exposed to 2% salt spary and extensive exposure out of doors to promote heavy rusting and pitting.

3. All plates were wire brushed and rubbed with coarse sandpaper prior to applying the protective coatings. Both sides of the plates were treated.

4. The rusted motor car body panel was brushed and sandpapered then washed with clean water.

A one inch wide bristle paint brush was used to apply the protective emulsion except when an air sprayer was used for the car panel and some of the topcoats.

The first coat of the protective emulsion was allowed to dry thoroughly before any subsequent coats were applied.

A dark blue-black colour developed on the treated plates indicating the complexing of the iron surface.

Comparisons were made after treating the painted plates to 100 hours in a salt spray cabinet using a 2% sodium chloride solution at 20°-30° C.

Those plates treated with the acrylic polymer preparation:
1 coat showed rusting in 24 hours
2 coats showed rusting in 36 hours Those plates treated with the vinylidene/chloride/vinyl chloride copolymer
1 coat showed slight rusting in 90 hours
2 coats showed No rusting in more than 100 hours Those plates which were pre-rusted did not show significant differences from the bright metal plates.

Where the second coat was allowed 24 hours to dry and then smoothed with wet sandpaper the surface was rust free for more than 100 hours in the salt spray.

The second part of these tests involved the assessment of compatability of (b) with various types of paint and was applied to both bright steel and rusted steel plates.

In general all varieties of paints tried showed good adhesion.

More specifically:

Aerosol paints both cellulose and synthetic varnish gave excellent results.

Automotive finishes in cellulose and 2 part acrylic, applied by brush and by spraying were completely satisfactory.

A rusted car panel was sprayed with 2 coats of the vinylidene copolymer preparation, the black surface was allowed 24 hours to harden before spraying with an epoxy type filler, this was built up to cover the rust pitting and rubbed down before applying a cellulose decorative paint—after 48 hours drying the section was immersed in a water tank for 7 days when no blistering or loosening of the filler was observed.

In further tests, treated plates with 2 coats of the vinylidene preparation were subjected to 2 hours stoving at 80° C. and then painted with an acrylic resin paint and stoved for a further 2 hours. The resulting finish was found to be as durable as the paint makers' claims, in resisting damp, attrition and bending. There being no apparent difference between the bright metal and the rusted plates.

The composition of the present invention, when applied to articles already rusted, showed superior adhesion to Haloflex alone.

Another embodiment of the invention is as follows:

|  | preferred | variation |
|---|---|---|
| Haloflex 202 | 82.6% | 75-85% |
| Water | 3.6% | 0-4% |
| Pyrogallic acid | 1.8% | 0.5-3% |
| Butyl Ethoxol | 4.0% | 0-5% |
| Isopropanol | 8.0% | 5-12% |
|  | 100.0 |  |

Haloflex 208 may be used in place of Haloflex 202.

TEST RESULTS

1. Plates of grit blasted steel painted with two coats of the preferred formula.
   (a) were tested in a salt spray cabinet at 25° C. after 1000 hrs a few very small blisters occurring near cut edges were observed.
   (b) Similar plates coated with cellulose, acrylic and alkyd paints showed serious rusting.

Plates coated with two coats of the inhibiting paint before painting with these finishing enamels showed no significant corrosion after 1000 hrs saltspray.
   (c) Water permeability of the latex used has been assessed and found to be in the order of 1% of that of most other emulsion latices, and comparable to or better than chlorinated rubber paints.
   (d) Grit blasted plates coated with 2 coats of the preferred formula were immersed in water for three months without showing signs of deterioration or rust creeping in from cut edges.

The latex used has a very low toxicity and does not cause eye damage or respiratory hazard.

The finished dried film is flame retardant.

There may be added to the compositions of the present invention other substances well known as additives to paints and varnishes such as fillers, extenders, wetting agents, surfactants and the like.

Compositions according to the invention can be painted over damp or wet rusted metal. The water is absorbed from the iron or steel surface but is prevented from returning as the composition dries.

What is claimed is:

1. A film forming aqueous emulsion for treatment of rusted ferrous articles comprising:
   a latex comprised of a copolymer derived from:
   (i) vinylidene chloride
   (ii) vinyl chloride; and
   (iii) one or more alkyl acrylates and/or alkyl methacrylates having from 1 to 12 carbon atoms in the alkyl group; and
   a chelating agent comprising pyrogallol, said pyrogallol being present in an amount between 0.5 and 5.0 percent by weight of said aqueous emulsion.

2. The emulsion of claim 1 wherein said chelating agent consists essentially of pyrogallol in said amount.

3. The emulsion of claim 1 wherein:
   (a) the proportion of vinylidene chloride is from 20 to 95 parts by weight per hundred parts by weight of total vinylidene chloride and vinyl chloride,
   (b) the proportion of vinylidene chloride is not more than 75 parts by weight per hundred parts by weight of total vinylidene chloride, vinyl chloride and the said acrylate(s) and/or methacrylate(s) and
   (c) the proportion of the said acrylate(s) and/or methacrylate(s) is more than 15 but less than 45 parts by weight per hundred parts by weight of total vinylidene chloride and vinyl chloride.

4. The emulsion of claim 1 wherein the copolymer is derived from:
   (a) vinylidene chloride in an amount between 65 and 90 percent by weight;
   (b) the said acrylates and/or metacrylates in an amount between 2 and 15 weight percent by weight; and
   (c) at least one aliphatic alpha-beta-unsaturated carboxylic acid in an amount between 0.2 and 8.0 weight percent, each of the total vindylidene chloride and vinyl chloride.

5. The emulsion of claims 3 or 4 wherein the said emulsion comprises up to 10 weight percent water.

6. The emulsion of claim 5 further comprising up to 5 weight percent ethylene glycol mono-butyl ether.

7. The emulsion of claim 6 further comprising between 5 and 12 percent isopropyl alcohol.

8. The emulsion of claim 7 wherein the pH is between 1.8 and 2.5.

9. The emulsion of claim 5 in which the weight percentage of pyrogallol present in said emulsion is between 2 and 3 percent.

10. The emulsion of claim 5 wherein said chelating agent consists essentially of pyrogallol in said amount.

* * * * *

UNITED STATES PATENT AND TRADEMARK OFFICE
CERTIFICATE OF CORRECTION

PATENT NO. : 4,724,249
DATED : Feb. 9, 1988
INVENTOR(S) : Daniel Clarkson Roberts It is certified that error appears in the above-identified patent and that said Letters Patent are hereby corrected as shown below:

In the Description:

Column 2, line 56, delete "spary" and substitute -- spray --

In the Claims:

Column 4, line 54, delete "vindylidene" and substitute
-- vinylidene --

Signed and Sealed this

Nineteenth Day of July, 1988

*Attest:*

DONALD J. QUIGG

*Attesting Officer*    *Commissioner of Patents and Trademarks*